US009799359B1

(12) United States Patent
Olson et al.

(10) Patent No.: US 9,799,359 B1
(45) Date of Patent: Oct. 24, 2017

(54) RECORDING HEAD WITH AN ON-WAFER INTEGRATED LASER

(71) Applicant: Seagate Technology LLC, Cupertino, CA (US)

(72) Inventors: Scott Eugene Olson, Eagan, MN (US); Karim Tatah, Eden Prairie, MN (US); Yi-Kuei Ryan Wu, Fremont, MN (US); Mark Anthony Gubbins, Donegal (IE); Marcus B. Mooney, Donegal (IE); Michael James Hardy, Londonderry (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/464,910

(22) Filed: Mar. 21, 2017

Related U.S. Application Data

(63) Continuation of application No. 14/946,294, filed on Nov. 19, 2015, now Pat. No. 9,607,638.

(60) Provisional application No. 62/081,783, filed on Nov. 19, 2014.

(51) Int. Cl.
G11B 7/135 (2012.01)
G11B 5/48 (2006.01)
G11B 5/31 (2006.01)
G11B 5/00 (2006.01)

(52) U.S. Cl.
CPC ............ G11B 5/4866 (2013.01); G11B 5/314 (2013.01); G11B 2005/0021 (2013.01)

(58) Field of Classification Search
CPC .... G11B 2005/0021; G11B 2005/0005; G11B 5/314; G11B 7/131; G11B 7/127; G11B 7/1205; G11B 7/1374; G11B 7/1384

USPC ........ 360/59, 313; 369/13.13, 13.33, 112.23, 369/112.27, 120, 121
See application file for complete search history.

(56) References Cited

U.S. PATENT DOCUMENTS

| 6,294,450 | B1 | 9/2001 | Chen et al. |
|---|---|---|---|
| 7,622,367 | B1 | 11/2009 | Nuzzo et al. |
| 7,972,875 | B2 | 7/2011 | Rogers et al. |
| 7,998,330 | B2 | 8/2011 | Fang et al. |
| 8,261,660 | B2 | 9/2012 | Menard |
| 8,333,860 | B1 | 12/2012 | Bibl et al. |
| 8,456,969 | B1 | 6/2013 | Mooney et al. |
| 8,501,536 | B2 | 8/2013 | Mooney et al. |
| 8,518,204 | B2 | 8/2013 | Hu et al. |
| 8,634,280 | B1 | 1/2014 | Wang et al. |
| 9,105,286 | B2 | 8/2015 | Boone, Jr. |
| 2007/0215480 | A1 | 9/2007 | Fang et al. |
| 2009/0217517 | A1 | 9/2009 | Pique et al. |
| 2011/0018158 | A1 | 1/2011 | Menard |
| 2013/0330853 | A1 | 12/2013 | Tischler |

(Continued)

OTHER PUBLICATIONS

Stadler et al., "Integrated Magneto-Optical Materials and Isolators: A Review", IEEE Phototonics Journal, 2013, 16 pages.

Primary Examiner — Nabil Hindi
(74) Attorney, Agent, or Firm — Hollingsworth Davis, LLC

(57) ABSTRACT

A recording head includes a layer of plasmonic metal deposited on a surface of the recording head. One or more non-self-supporting layers of crystalline material are attached to the plasmonic metal, the one or more layers of crystalline materials configured to form an active region of a laser. A waveguide is configured to receive plasmons from the laser and direct the plasmons to a recording medium.

20 Claims, 10 Drawing Sheets

(56) References Cited

U.S. PATENT DOCUMENTS

2014/0044144 A1   2/2014  Vo et al.
2014/0373898 A1  12/2014  Rogers et al.

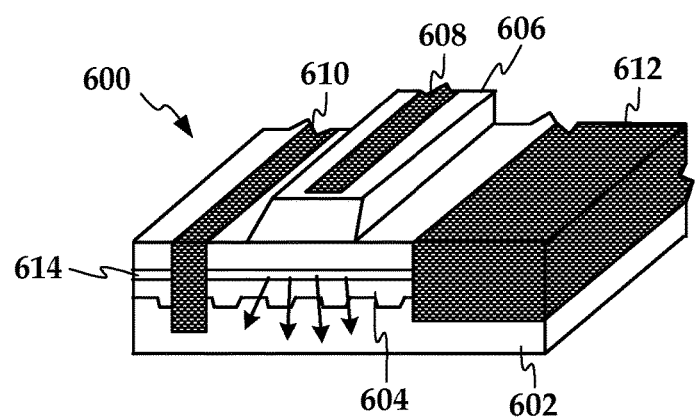
*FIG. 7*
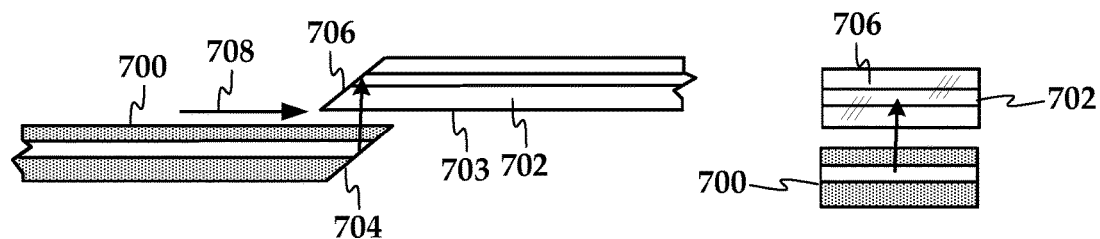
*FIG. 8A*  *FIG. 8B*
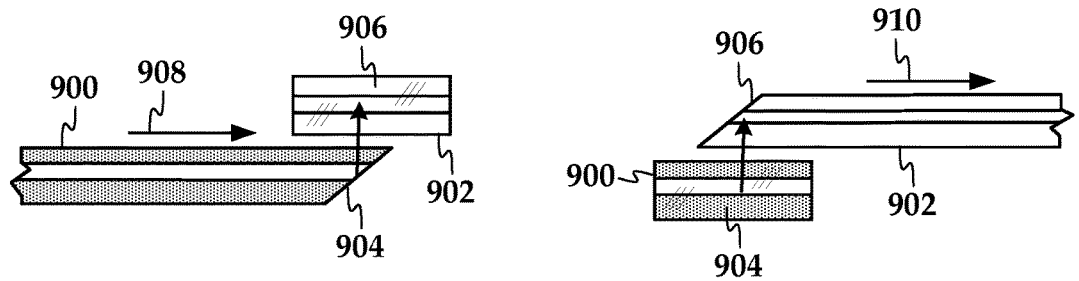
*FIG. 9A*  *FIG. 9B*

RECORDING HEAD WITH AN ON-WAFER INTEGRATED LASER

RELATED PATENT DOCUMENTS

This application is a continuation of U.S. application Ser. No. 14/946,294, filed Nov. 19, 2015, which claims the benefit of Provisional Patent Application Ser. No. 62/081,783 filed on Nov. 19, 2014, to which priority is claimed, and which are incorporated herein by reference in their entireties.

SUMMARY

The present disclosure is related to a recording head with an on-wafer integrated laser. In one embodiment, a recording head includes a layer of plasmonic metal deposited on a surface of the recording head. One or more non-self supporting layers of crystalline material are attached to the plasmonic metal, the one or more layers of crystalline materials configured to form an active region of a laser. A waveguide is configured to receive plasmons from the laser and direct the plasmons to a recording medium.

In another embodiment, a recording head includes a waveguide with an exposed surface. A non-self-supporting, laser subassembly attached to the exposed surface, the laser subassembly comprising one or more crystalline layers such that light is emitted from the one or more crystalline layers through the exposed surface. First and second mirrors are formed on respective first and second ends of the laser subassembly, and electrical leads are formed on and coupled to the laser subassembly.

In another embodiment, a recording head includes a slider waveguide formed on a substrate. A non-self-supporting, laser subassembly is bonded to the slider waveguide. The non-self-supporting laser subassembly includes at least two stripes, the at least two stripes exciting a higher-order mode laser output. A coupling waveguide is configured to couple the higher-order mode laser output to a delivery waveguide, the delivery waveguide delivering the laser output to a recording medium.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIG. 7 is a perspective view showing additional details of a laser subassembly according to an example embodiment;

FIGS. 8A, 8B, 9A, and 9B are diagrams illustrating vertical laser to waveguide coupling arrangements according to example arrangements;

DETAILED DESCRIPTION

Figure 1:
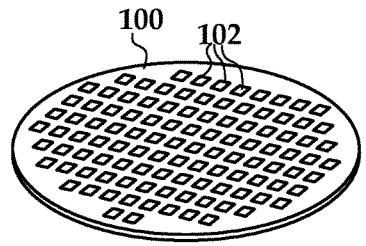
FIGS. 1-5 are diagrams showing a transfer printing process according to an example embodiment.

In the following description, reference is made to the accompanying set of drawings that form a part of the description hereof and in which are shown by way of illustration of several specific embodiments. It is to be understood that other embodiments are contemplated and may be made without departing from the scope of the present invention. The following detailed description, therefore, is not to be taken in a limiting sense.

This disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer, that shapes and directs the energy from the energy source to the recording medium.

In current implementations, the read/write head and laser diode are formed using separate processes, aligned using a surface-mount placement process (e.g., pick and place), and bonded together (e.g., using solder). While this type of assembly process is well-established for assembly of electronic components, there are challenges in mass-assembly of HAMR read/write heads using these processes.

One challenge in assembling laser diodes onto a read/write head is the precise alignment needed. While electrical components can operate if misaligned so long as the conductive paths are sufficiently established, misalignment between a laser and read/write head can result in a loss of optical efficiency that can render the head unusable. Another challenge relates to the size of the resulting assembly. The read/write head has a limited vertical distance (normal to the recoding surface) in which to operate. In some implementations, the addition of a laser and intermediate structures (e.g., submounts) can exceed the available spacing. Such additional structure can add undesirable weight, as do the laser packaging and electrical joints that electrically couple the laser to the read/write head.

In the present disclosure, hard drive recording heads are proposed onto which at least part of a semiconductor laser (e.g., crystalline, epitaxial layer) is not self-supporting (e.g., not a separately packaged device) but is physically carried by same substrate that carries the other components of the read/write head (e.g., write coil and poles, reader stack) without the use of a separate or intermediate support during attachment. Carrying the semiconductor laser with the read/write head substrate, without a separate or intermediate support substrate, can help to reduce the size and weight of the head, and it can also allow for the use of laser geometries and designs that are very different from simple edge-emitting cleaved facet lasers that have been proposed in the past.

In at least some cases, parts of the laser (e.g., GaAs active region) are incompatible with epitaxial growth on the substrate. As such, the laser cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the slider-integral laser.

This process of transferring non-self-supporting layers of epitaxial-growth-incompatible layers is referred to herein as On-Wafer Laser (OWL) process integration. This process may also be referred to as transfer printing, dry transfer printing, nanoprinting, etc. In FIGS. 1-5, block diagrams illustrate transfer printing of components onto a recording head according to an example embodiment. In FIG. 1, a donor substrate 100 includes a number of components 102 (e.g., epitaxial layers) formed using a first process (e.g., crystalline growth). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: epitaxial material layer, adhesion or protection layers, carrier layers (to increase thickness for easier transport), bonding layers to aid in best print transfer, and integration layers to enable subsequent integration (e.g., stop material to allow planarization after integration).

Figure 2:
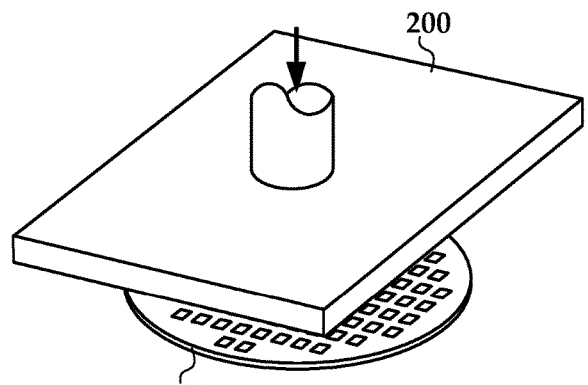
Figure 3:
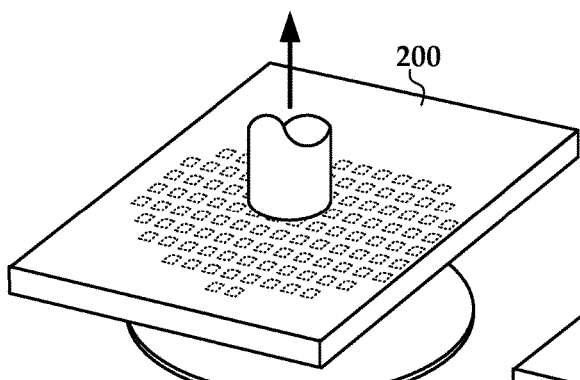

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 210 as shown in FIGS. 4-5.

Figure 4:
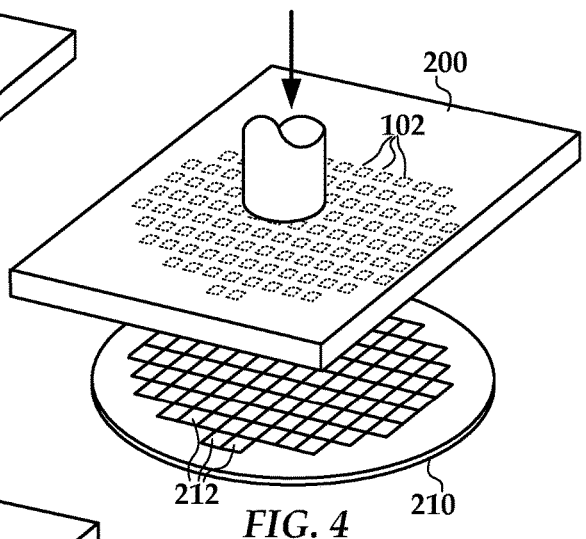
Figure 5:
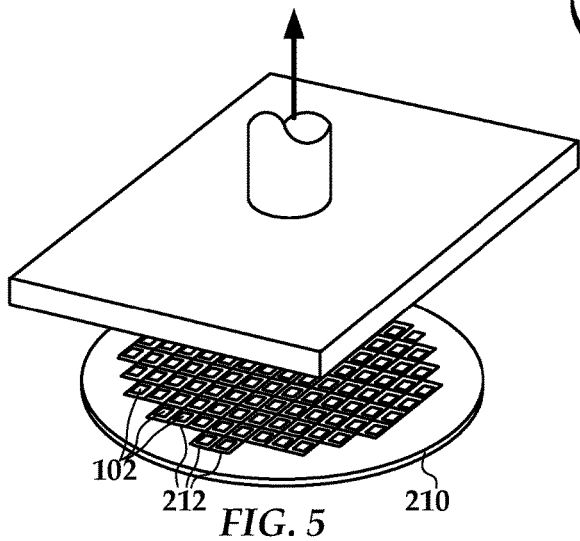

As seen in FIG. 4, the transfer print head 200 is lowered over a wafer 210 that includes a number of partially-processed recording heads 212. The transfer print head 200 presses the components 102 on to the wafer 210 and is then pulled away as seen in FIG. 5. This attaches the components 102 to the recording heads 212. Afterwards, the wafer 210 is further processed, e.g., etching the components 102 to final shape and alignment, and adding additional layers of material to form additional recording head components. Additional details of transfer printing laser materials onto slider substrates are provided in U.S. Ser. No. 14/946,116 filed on same date herewith, which is incorporated by reference in its entirety.

Coupling the output from a laser diode into an optical waveguide may involve subwavelength alignment of the laser active region to the acceptance pupil of the optical elements used to couple the emission into the waveguide. The precision needed for vertical position can be relaxed by placing grating elements in the laser and/or in the waveguide coupler to direct emission at an angle tilted from the active region plane (e.g., vertical or surface emission) relaxes. Emitting into the substrate is possible for OWL, so the grating can direct light opposite the contacts, allowing good thermal and electrical connection.

Figure 6A:
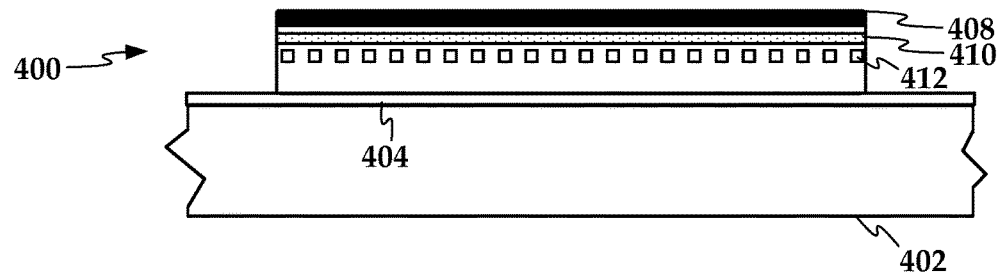
FIGS. 6A-6D show the formation of a transfer printed laser according to an example embodiment.
Figure 6B:
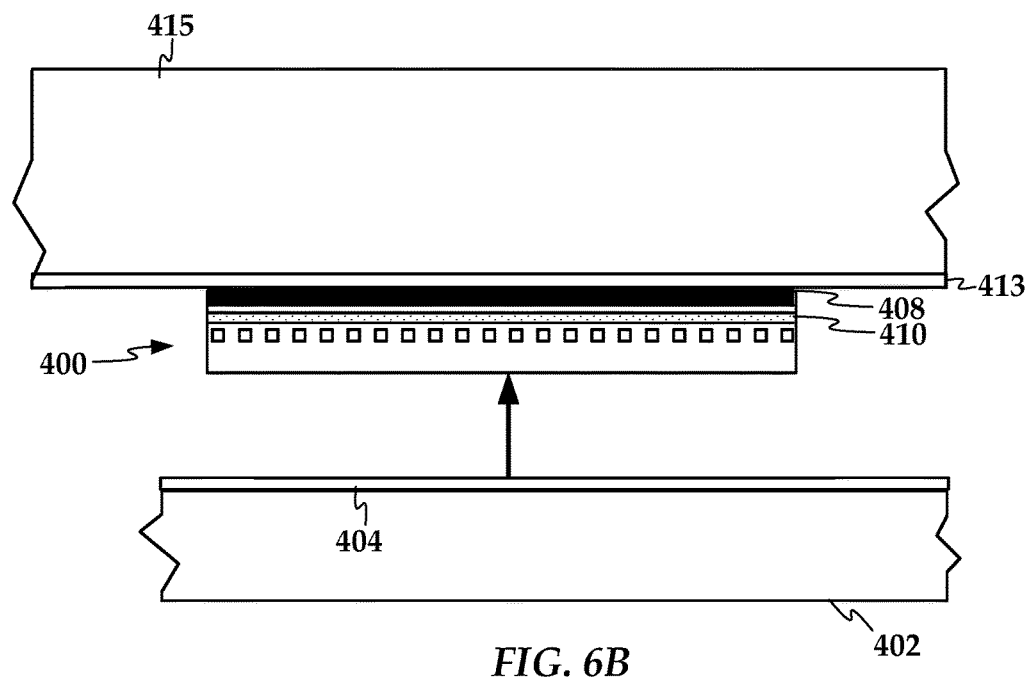
Figure 6C:
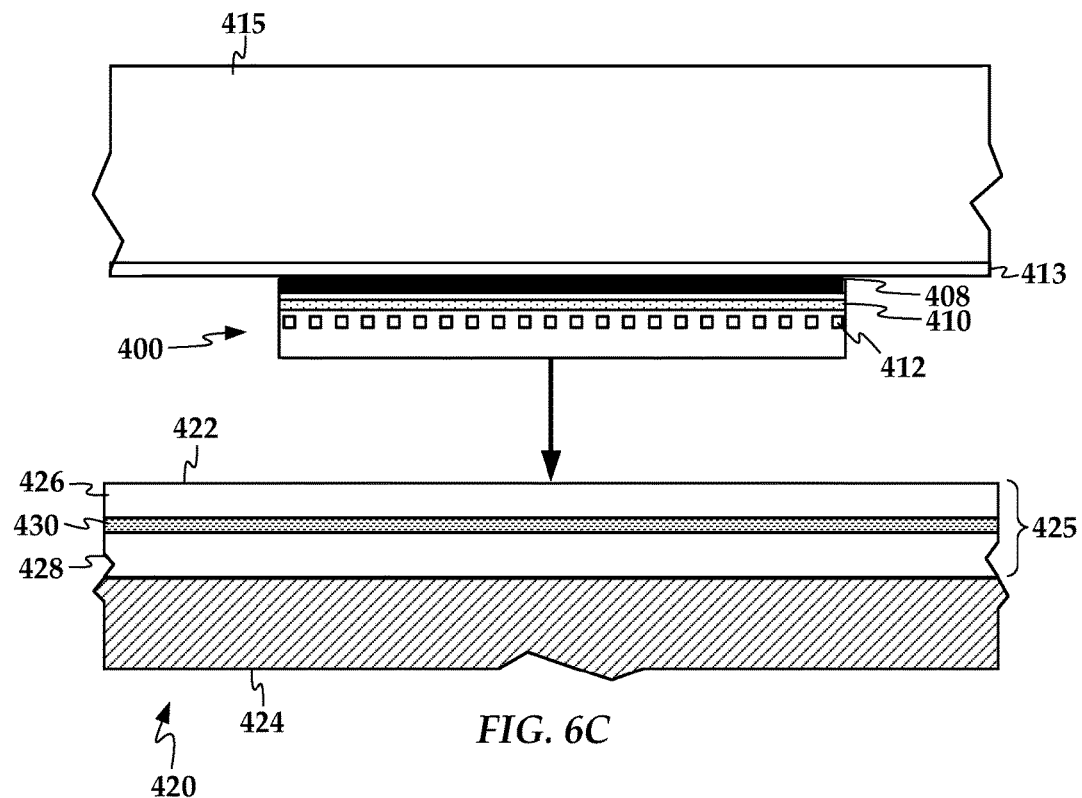

In reference to FIG. 6A, a block diagram illustrates formation of an OWL laser according to an example embodiment. A non-self-supporting laser subassembly 400 is shown built upon a substrate 402 and a sacrificial layer 404. In this example, the laser subassembly 400 includes one or more contacts 408, and active region 410, and a grating 412. As seen in FIG. 6B, the laser assembly 400 is lifted off the substrate 402 by a carrier film 413 that attached to transfer print tool 415. As seen in FIG. 6C, the laser subassembly 400 is lowered to an exposed surface 422 of a slider body 420 where it is affixed (e.g., bonded), after which the carrier film 413 and transfer print tool 415 are removed. The slider body 424 includes a substrate 424 with a waveguide 425 at the top surface 422. The waveguide 425 includes cladding layers 426, 428 and core layer 430. The laser assembly 400 is transfer printed to the exposed surface 422 and the substrate 402 and sacrificial layer 404 are subsequently lifted away.

Figure 6D:
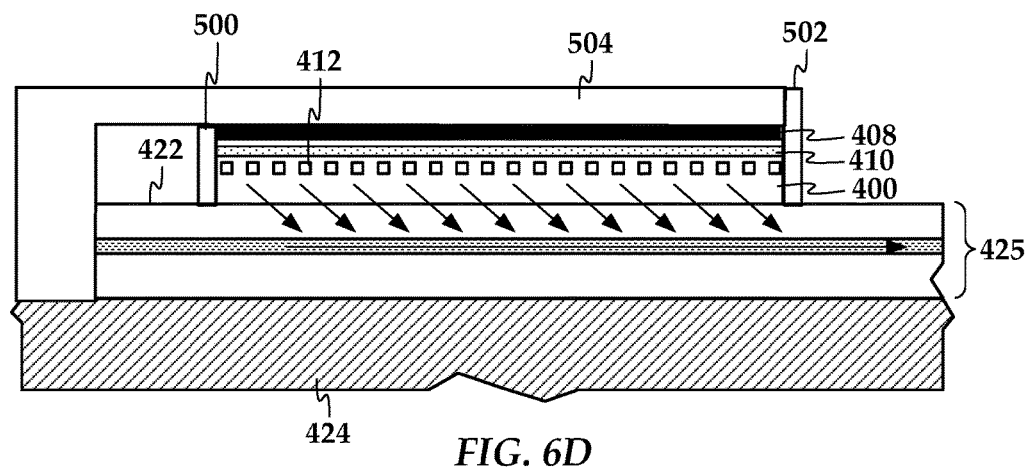

In FIG. 6D, a block diagram shows additional features formed on the slider assembly after the initial transfer printing shown in FIGS. 6A-6C. The attachment (e.g., bonding) of the laser subassembly 404 results in grating-assisted optical coupling between the laser and the waveguide 425 as indicated by the arrows. Light is emitted from the active region 410 through the exposed surface 422 via the grating 412, where it is coupled to the waveguide 425. Post-attachment, mirrors 500, 502 are formed on either side of the laser subassembly, and an electrical connection 504 is formed over the top of the laser subassembly 400, electrically coupled to the contact(s) 408. The electrical connection 504 may also act as a heat sink for the laser. Both the connection 504 and mirrors 500, 502 are formed using processes such as photolithography to deposit the materials and etch the materials to the desired shape. This subsequent processing may also etch the laser subassembly 404 to a desired shape and add additional features, e.g., vias for the attachment at least one electrical lead.

In FIG. 7, a perspective view shows additional details of a non-self-supporting laser subassembly 600 according to an example embodiment. A bottom layer 602 is made of n-type material, in which a grating 604 is formed. A top layer 606 includes p-type material. An anode 608 is formed on the p-type material layer 606. Cathode terminals 610, 612 are coupled to the n-type material layer 602 through vias. Light is emitted from an active layer 614 through the grating 604, as indicated by the arrows. The shape of the top layer 606 may be formed after the subassembly 600 is attached to a recording head surface. The cathode terminals 610, 612 may have been formed together with the other layers 602, 604, 606, 614 before attachment. In such a case, the processing that forms the shape of the top layer 606 also exposes the top surfaces of the terminals 610, 612. Electrical leads are formed to over the terminals 608, 610, 612 during post-attachment processing.

In another embodiment, an OWL laser and waveguide can be coupled vertically. Vertical coupling allows for planar deposition of waveguide materials, which results in a low-loss optical waveguide for light delivery to near-field elements. Etching the laser mirrors on-wafer results in precise alignment to features on the slider. Also, standard tapered couplers may be used for highly-efficient optical coupling to the slider waveguide.

In FIGS. 8A, 8B, 9A, and 9B, diagrams illustrate vertical laser to waveguide coupling arrangements according to example arrangements. In FIGS. 8A-8B, respective side and front view show a vertical/linear alignment between a laser 700 and waveguide 702, each with respective angled (e.g., 45-degree) mirrors 704, 706 at one end. Light propagates down a direction 708 to which both the laser 700 and waveguide 702 are longitudinally aligned. The light is reflected from mirror 704, through exposed surface 703 of the waveguide 702, where it reflects off of mirror 706. In FIGS. 9A-9B, respective side and front views show a cross-alignment between a laser 900 and waveguide 902, each with respective angled (e.g., 45-degree) mirrors 904, 906. Light propagates along a first direction 908 to which the laser 700 is longitudinally aligned, and then propagates along second direction 910 to which the waveguide 902 is longitudinally aligned. The first and second directions 908, 910 are at 90 degrees to each other in this example, although other angles are possible.

By etching 45° mirrors into the laser surface and the slider surface at right angles to each other, vertical coupling from lasers to slider waveguides is determined by the horizontal positions of the mirrors rather than by the vertical location of the laser active region and the waveguide core. One issue with this coupling scheme is that the depth to the laser active region may need to be precisely controlled and/or a method used to identify the vertical location of the laser active region and the slider waveguides and compensate to account for variation in this depth.

Laser material (e.g., non-self-supporting epitaxial layers) may be transferred to the slider and subsequently etched into shapes that promote optical coupling to near-field transducers (NFTs) placed in proximity to the laser. These NFT-integrated lasers, or plasmonic lasers, have dimensions much smaller than the wavelength of light due to the presence of plasmonic layers on the boundaries of the semiconductor device. These layers result in sub-wavelength confinement of light within the cavity and allow lasing action to occur at much smaller dimensions than laser cavities formed of semiconductor materials only. High-quality semiconductor laser semiconductor layer used in the proposed devices is grown on high-quality crystalline substrates. The transfer print process allows these devices to be fabricated on the necessary crystalline substrates and then transferred to the recording head wafer.

Figure 10:
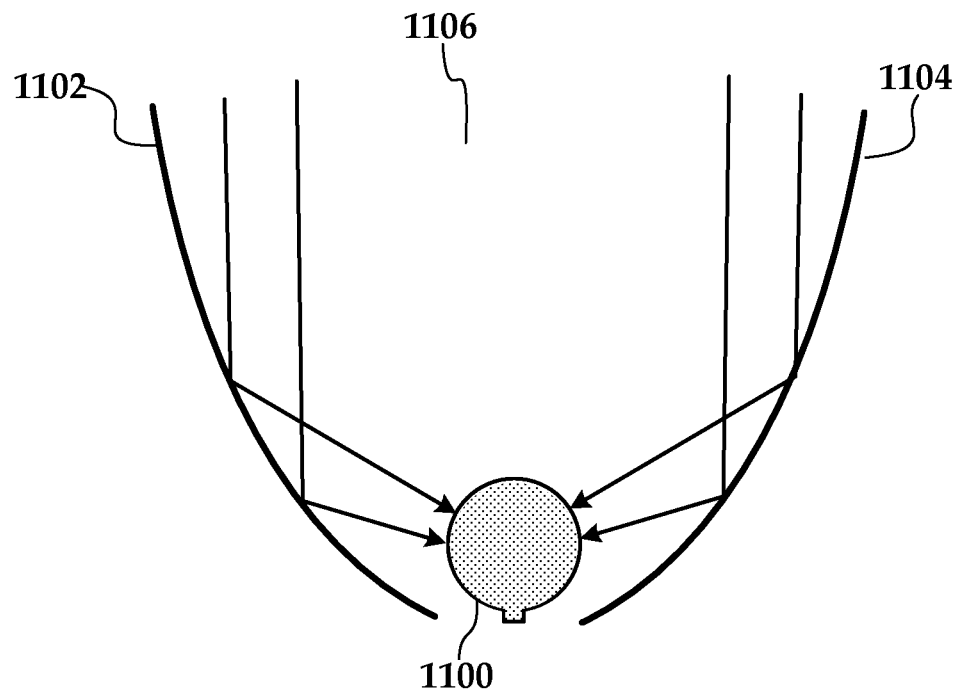
FIGS. 10-12 show plasmonic laser arrangements according to example embodiments.
Figure 11:
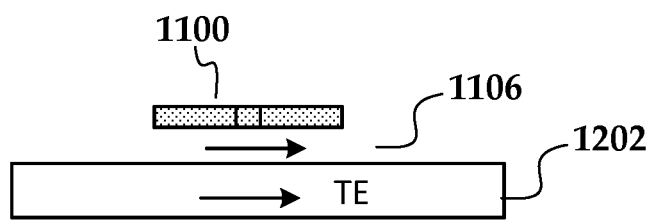
Figure 12:
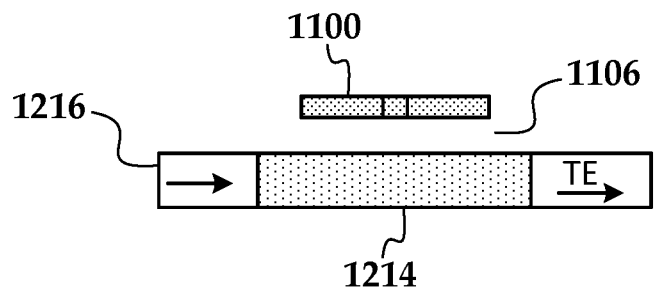

In FIGS. 10-12, diagrams illustrate an optically pumped laser disk resonator according to an example embodiment. As best seen in FIG. 11, an integrated laser diode material 1106 is located between a gold disk 1100 and provides light pumping for light received from a waveguide core 1202 (e.g., Ta2O5). As seen in FIG. 10, parabolic mirrors 1102, 1104 can be used to concentrate the light proximate the gold disk 1100. The light field from the laser disk resonator couples evanescently and excites surface plasmons in the gold disk 1100. The gold disk 1100 transfers energy to the media through with the peg lighting-rod effect. The disk lasing medium 1106 can be embodied with different gain media options. In FIG. 12, a cross sectional view shows gain media 1214 located proximate a waveguide 1216. Examples of the gain medium 1214 include ruby (Al2O3: Cr), sapphire with chromium ion dopant, Nd:YAG, Nd:YLF, or GaAlAs.

Figure 13:
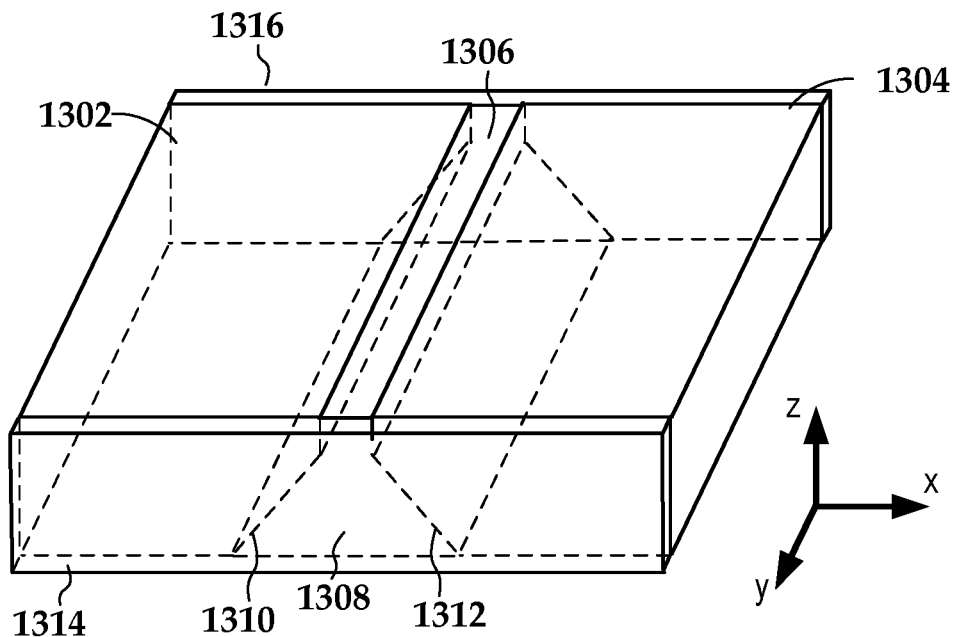
FIGS. 13-15 show plasmonic laser arrangements according to example embodiments.
Figure 14:
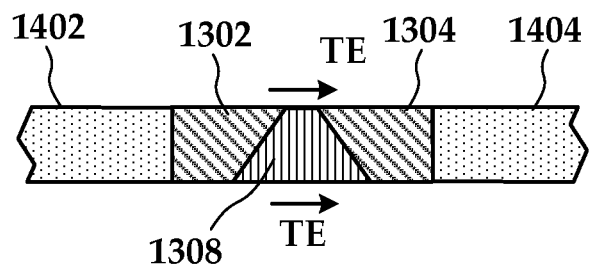
Figure 15:
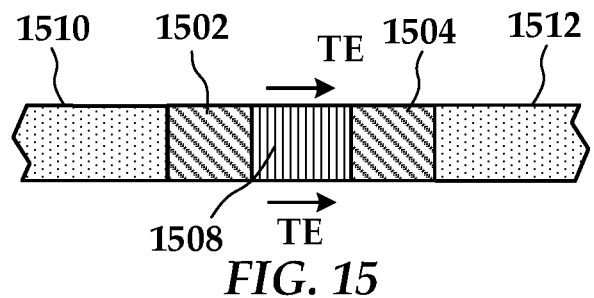

In FIGS. 13-15, block diagrams illustrate forming an NFT-integrated laser according to an example embodiment. In the perspective and cross-sectional views of FIGS. 13 and 14, a gap NFT includes first and second plate-like elements 1302, 1304 formed of a plasmonic metal such as gold. The elements are formed on a substrate-parallel xy-plane. A gap 1306 separates the elements 1302, 1304, and interior sides 1310, 1312 of the elements 1304 facing the gap are sloped. The laser gain material 1308 may be etched into the shape of the interior of the gap 1306 with gold subsequently deposited on the outside of the laser material to for the NFT elements 1302, 1304. Mirrors 1314, 1316 are also formed at the ends of the gap NFT to form a resonant cavity so that the gain of the laser exceeds the loss due to the surface plasmon coupling resulting in efficient conversion of electrical energy to optical absorption in HAMR media. As seen in FIG. 14, sides of the NFT elements 1302, 1304 facing away from the gap are surrounded by a dielectric waveguide material 1402, 1404, e.g., $Ta_2O_5$.

In FIG. 15, a cross sectional view shows an alternate configuration of an NFT-integrated laser with first and second plate-like elements 1502, 1504 separated by a gap filled with laser gain material 1508. Dielectric portions 1510 (e.g., $Ta_2O_5$) surround the elements 1502, 1504. The NFT configuration shown in FIG. 15 may be substantially similar to what is shown in FIGS. 13 and 14, except that sides of the elements 1502, 1504 facing the gap are perpendicular to the substrate surface.

Lasers with nano-sized dimensions can be fabricated on crystalline substrates and deposited on recording head wafers using the transfer printing techniques described herein. This has the advantage of improved reliability for the near field transducer due to the increase robustness of the laser material and the presence of optical gain in the near-field transducer. In reference now to FIGS. 18-21 diagrams illustrate a structure and assembly process for such a nano-sized device.

Figure 16:
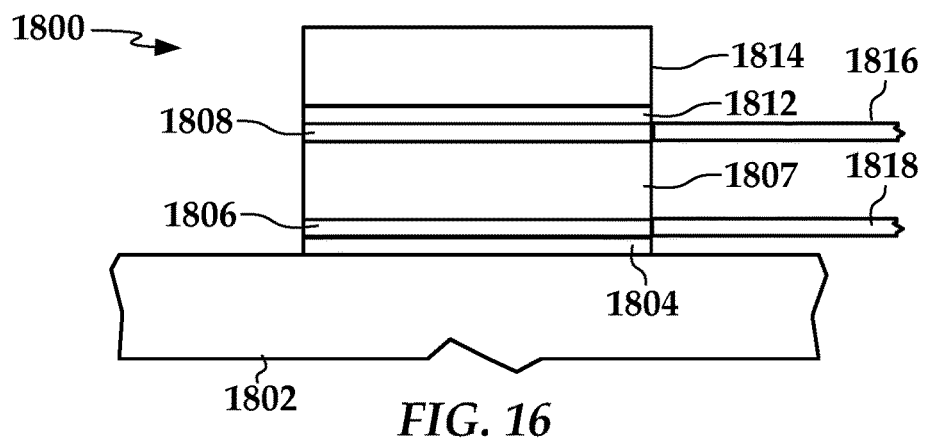
FIG. 16 shows an NFT-integrated laser according to an example embodiment.

In FIG. 16, a side view shows an NFT-integrated laser assembly 1800 according to an example embodiment. The laser assembly 1800 includes a near-field transducer coupled to a nano-cavity laser. The laser assembly 1800 is built on a plasmonic layer 1802 (e.g., gold), which is on a recording head wafer. From bottom to top are a dielectric spacer 1804, a thin III-V semiconductor layer 1806, a III-V semiconductor cavity 1807, a second thin III-V semiconductor layer 1808, a dielectric spacer 1812, and a top layer of plasmonic material 1814. From the top, the laser assembly 1800 may similar to the disk-peg seen in FIG. 10, with a width 1606 between 200-200 nm. The disk-peg shaped layer is a shaped plasmonic cavity that creates a sub-50 nm plasmonic spot. Electrical layers 1816, 1818 (e.g., leads) provide current to the semiconductor layers 1806, 1808 and may be formed after the laser assembly on top of supporting insulating layers (not shown).

Figure 17:
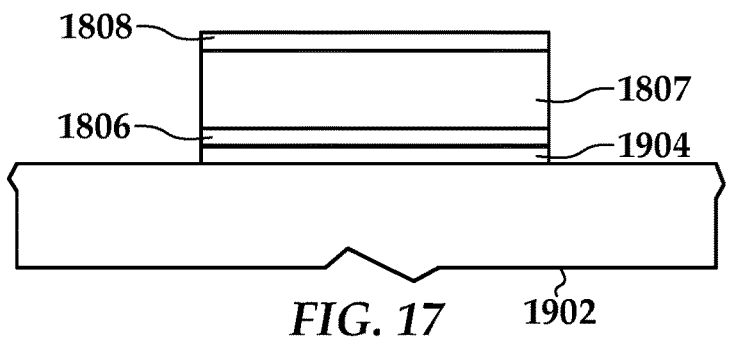
FIGS. 17-19 illustrate a structure and assembly process the NFT-integrated laser of FIG. 16.
Figure 18:
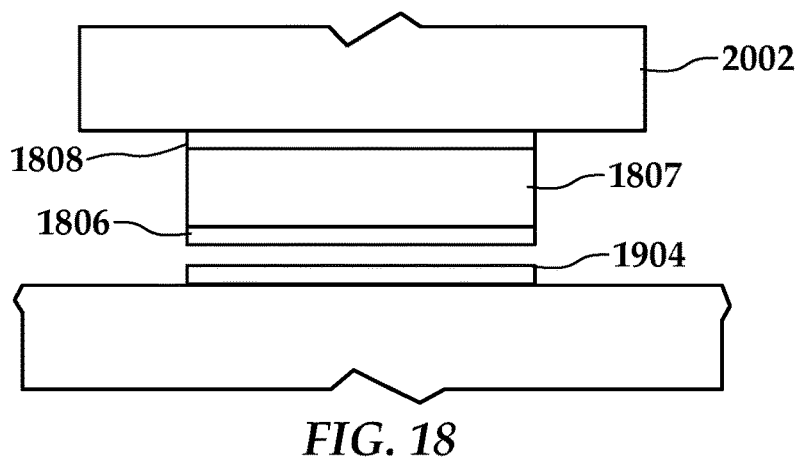
Figure 19:
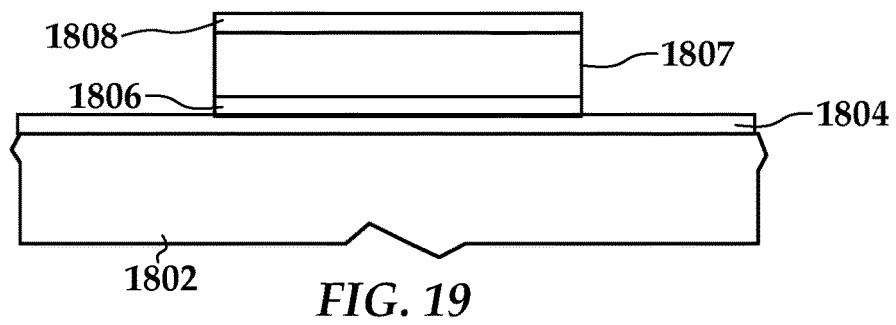

In FIGS. 17-19, diagrams show a process used to create the laser assembly shown in FIG. 16. The III-IV semiconductor layers are formed on a spacer layer 1904 which is on a donor substrate 1902. As seen in FIG. 18, a stamp 2002 removes the III-V layers 1806-1808 which separate from the spacer layer 1904. The stamp 2002 transfers the III-V layers 1806-1808 to the recording head wafer which has the plasmonic layer 1802 and spacer layer 1804 deposited before the transfer. The diagram in FIG. 19 shows the assembly after transfer of the layers 1806-1808 to the recording head wafer, but before deposition of the second spacer 1812 and plasmonic layer 1814 as shown in FIG. 16.

Figure 20:
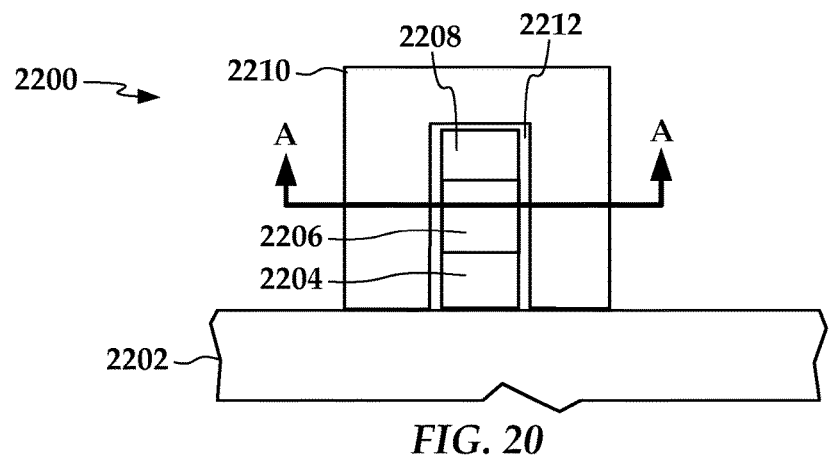
FIGS. 20-22 are block diagrams illustrating plasmonic laser assemblies according to additional embodiments.
Figure 21:
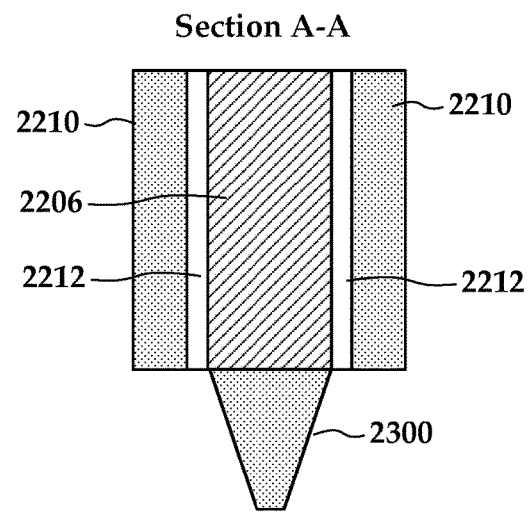
Figure 22:
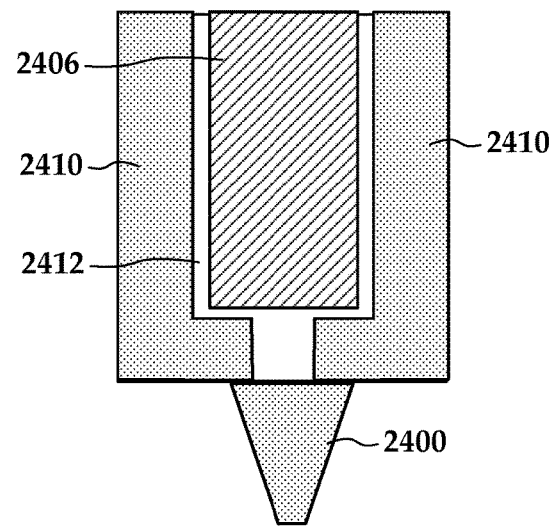

In reference now to FIGS. 20-22, block diagrams illustrate plasmonic laser assemblies according to additional embodiments. In FIG. 20, a front view shows an NFT-integrated laser assembly 2200 assembled onto a substrate 2202. A laser active region 2206 is located between two cladding layers 2204, 2208, all being surrounded by a plasmonic layer 2210 (e.g., gold). A gap 2212 is shown between the plasmonic layer 2210 and internal layers 2204, 2206, 2208. The gap 2212 may be filled with appropriate materials, e.g., a dielectric. In FIG. 21, a cross section is shown that corresponds to section A-A in FIG. 20. A plasmonic waveguide 2300 is also shown extending from an emission end of the active region 2206. The plasmonic waveguide 2300 guides and shapes the surface plasmons to a recording medium.

In FIG. 22, a cross sectional view similar to that of FIG. 21 shows an alternate embodiment of a plasmonic laser assembly. A plasmonic layer 2410 surrounds an active region 2406, separated by a gap 2412. The active region 2406 may be surrounded on the top and bottom by cladding layers similar to the embodiment shown in FIG. 20. In this example, the plasmonic layer 2412 extends to cover part of an emission end of the active region 2406. A plasmonic waveguide 2400 guides and shapes the surface plasmons to a recording medium.

As noted above, after deposition of the crystalline laser materials onto a slider, additional features are formed, such as mirrors. In some embodiments, distributed Bragg reflector (DBR) mirrors may be deposited on the laser surface to form high or low-reflectance laser mirrors. Alternatively, the mirrors may be deposited on the slider waveguide surface. In FIGS. 23-26, block diagrams show examples of DBR mirrors used with a transfer printed laser according to example embodiments.

Figure 23:
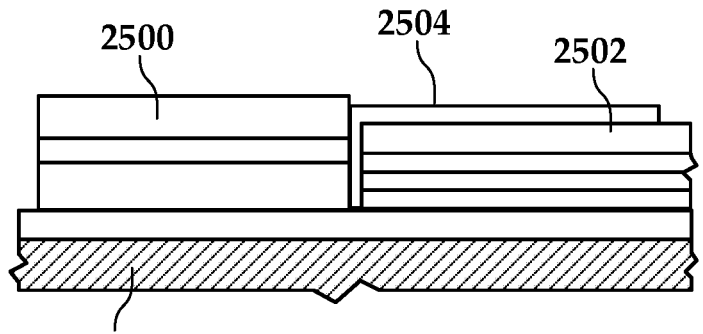
FIGS. 23-26 are block diagrams showing examples of mirrors used with a transfer printed laser according to example embodiments.

In FIG. 23, a laser 2500 is mounted on a read write head 2501. The laser 2500 includes layers that are attached to a surface of the read/write head 2501 (e.g., transfer-printed), and may be configured as an NFT-integrated laser as described above. The laser 2500 emits light into a light delivery element 2502, which may include an optical waveguide and/or a plasmonic waveguide. A DBR 2504 is formed over the light delivery element 2502. The laser 2500 may have a mirror (not shown) formed on an end facing away from the light delivery element 2502.

Figure 24:
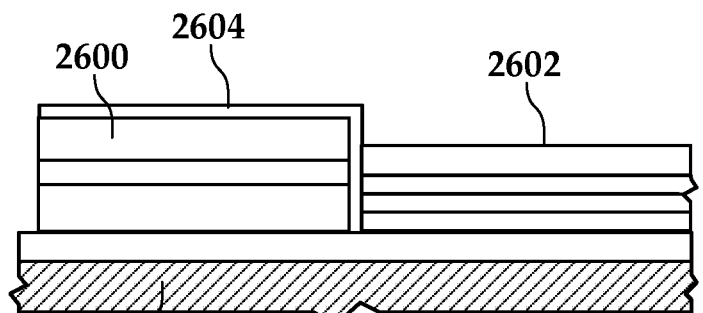

In FIG. 24, a laser 2600 is mounted on a read/write head 2601. The laser 2600 includes layers that are attached to a surface of the read/write head 2601 (e.g., transfer-printed), and may be configured as an NFT-integrated laser as described above. The laser 2600 emits light into a light delivery element 2602, which may include an optical waveguide and/or a plasmonic waveguide. A DBR 2604 is formed over the laser 2600. The laser 2600 may have a mirror (not shown) formed on an end facing away from the light delivery element 2602.

Figure 25:
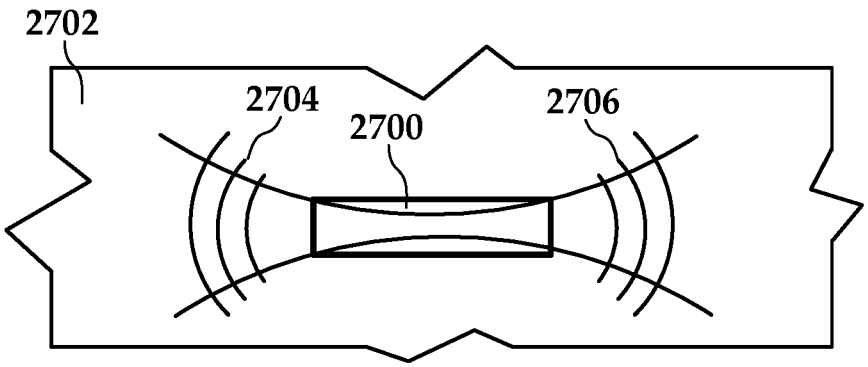

In FIG. 25, laser material 2700 is attached (e.g., transfer-printed) to a slider waveguide 2702, e.g., to a core or cladding layer of the waveguide 2702. Mode-selecting DBR grating mirrors 2704, 2706 are formed in the waveguide 2702 on either end of the laser material 2700. The DBR grating mirrors 2704, 2706 may be shaped to select a single, large mode. This large mode would have lower power density in the semiconductor material, thus reducing the catastrophic failure rate. The waveguide 2702 may be shaped to only reflect the TM mode, thereby lasing in TM only, which may be required for excitation of NFTs that couple to the TM mode.

Figure 26:
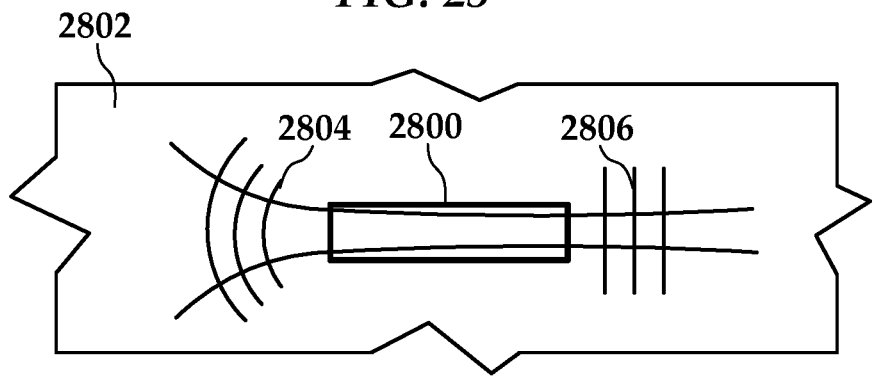

In FIG. 26, laser material 2800 is attached (e.g., transfer-printed) to a slider waveguide 2802, e.g., to a core or cladding layer of the waveguide 2802. A mode-selecting DBR mirror 2804 is formed in the waveguide 2802 on one end of the laser material 2800. A straight (non-mode shaping) DBR mirror 2806 is formed on the other end of the laser material 2800. This may also be used to select or tune a particular mode.

Figure 27:
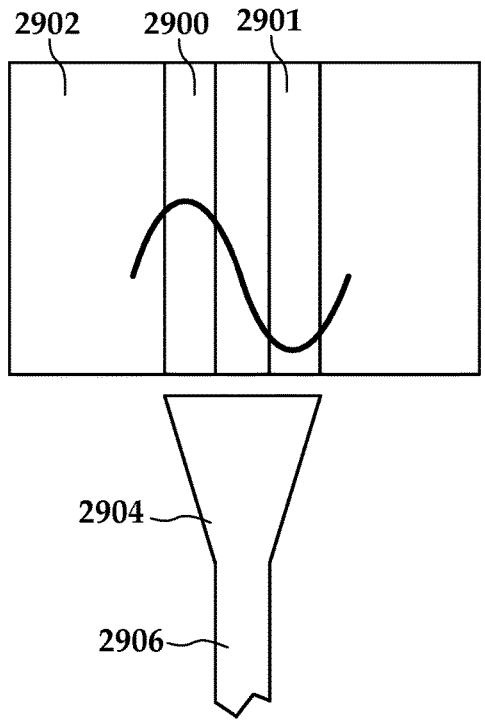
FIG. 27 is a block diagram of a transfer-printed higher-mode laser according to an example embodiment.

Butt-coupling of higher-order mode lasers (for example, lasers that support a TE10 anti-symmetric mode) is generally impractical since any misalignment causes a different mode to be excited in the waveguide to which the laser is coupled. In OWL, the laser emission is aligned to the waveguide with extreme precision since the laser stripe and waveguide sidewalls may be formed in a single photolithography step (or via precise overlay lithography). In FIG. 27, a block diagram illustrates an example of a transfer-printed higher-mode laser according to an example embodiment.

Laser stripes 2900, 2901 are attached (e.g., bonded) to a slider waveguide 2902 using laser printing. The slider waveguide 2902 is formed on a slider substrate using standard photolithographic processes, e.g., formed of non-crystalline dielectric materials. The stripes 2900, 2901 may have initially been attached as a single piece of crystalline laser material, or two pieces. After attachment, photolithography is used to create the final outline of the stripes 2900, 2901, such that the desired mode is excited. This may be any mode, including modes higher than fundamental TE00 or TM00 modes, the above-mentioned higher-order modes. Walls of a coupling waveguide 2904 are also formed using photolithography, resulting in the excited mode being efficiently coupled from the laser stripes 2900, 2901 into a delivery waveguide 2906, which delivers the energy to a recording medium.

Figure 28:
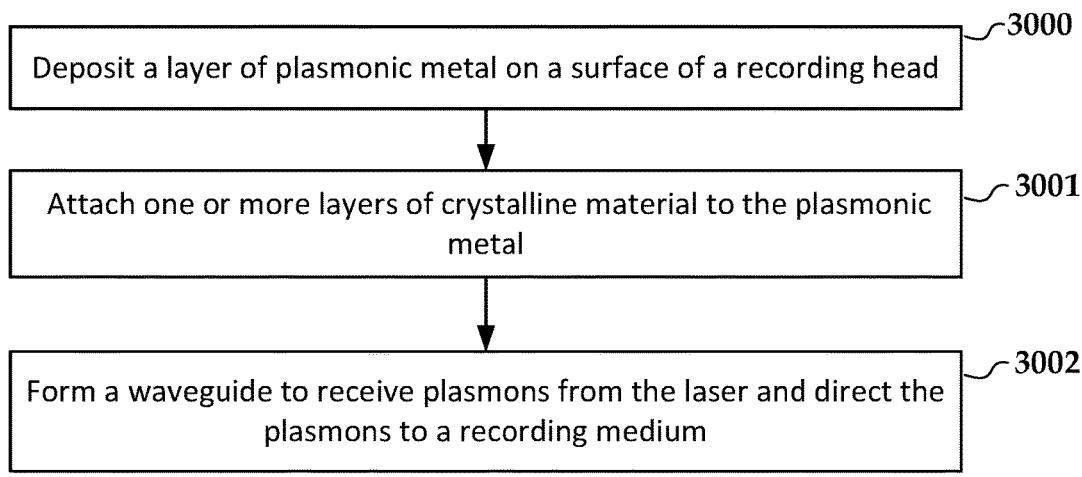
FIG. 28 is a flowchart showing a method according to an example embodiment.

In FIG. 28, a flowchart shows a method according to an example embodiment. The method involves depositing 3000 a layer of plasmonic metal on a surface of a recording head. One or more layers of crystalline material are attached 3001 to the plasmonic metal, the one or more layers of crystalline materials configured to form an active region of a laser. A waveguide is formed 3002 to receive plasmons from the laser and direct the plasmons to a recording medium.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

The invention claimed is:

1. A recording head comprising:
   two layers of cladding, one of the two layers deposited on a substrate of the recording head;
   one or more, non-self-supporting, layers of crystalline material between the two cladding layers, the one or more layers of crystalline material configured to form an active region of a laser; and
   a plasmonic layer surrounding the two layers of cladding and the one or more layers of crystalline material, the plasmonic layer comprises an opening from which an emission end of the active region emits light.

2. The recording head of claim 1, wherein the one or more layers of crystalline material are transfer printed to the recording head.

3. The recording head of claim 1, further comprising a gap of dielectric material between the plasmonic layer and internal layers, the internal layers comprising the two layers of cladding and the one or more layers of crystalline material.

4. The recording head of claim 3, wherein the plasmonic layer covers at least three sides of the internal layers.

5. The recording head of claim 1, further comprising a plasmonic waveguide extending from the emission end of the active region.

6. The recording head of claim 5, wherein the plasmonic waveguide shapes and guides plasmons to create a sub-50 nm spot on a recording medium.

7. The recording head of claim 1, wherein the plasmonic layer extends to cover part of an emission end of the active region.

8. The recording head of claim 1, wherein the One or more, non-self-supporting, layers of crystalline material are formed from a single piece of crystalline laser material that is processed after attachment to form the active region.

9. A recording head comprising:
internal layers comprising:
two layers of cladding, one of the two layers deposited on a substrate of the recording head;
one or more, non-self-supporting, layers of crystalline material between the two cladding layers, the one or more layers of crystalline material configured to form an active region of a laser;
a plasmonic layer surrounding the internal layers; and
a plasmonic waveguide extending from the emission end of the active region, the plasmonic waveguide shaping and guiding plasmons to a recording medium.

10. The recording head of claim 9, wherein the one or more layers of crystalline material are transfer printed to the recording head.

11. The recording head of claim 9, further comprising a gap of dielectric material between the plasmonic layer and the internal layers.

12. The recording head of claim 9, wherein the plasmonic layer covers at least three sides of the internal layers.

13. The recording head of claim 9, wherein the plasmonic waveguide shapes and guides plasmons to create a sub-50 nm spot on a recording medium.

14. The recording head of claim 9, wherein the plasmonic layer extends to cover part of an emission end of the active region.

15. The recording head of claim 9, wherein the one or more, non-self-supporting, layers of crystalline material are formed from a single piece of crystalline laser material that is processed after attachment to form the active region.

16. A method comprising:
activating an active region a laser, the active region formed of a one or more, non-self-supporting, layers of crystalline material between the two cladding layers, one of the two layers deposited on a substrate of the recording head;
in response to activating the active region, emitting light from an opening in a plasmonic layer surrounding the two layers of cladding and the one or more layers of crystalline material; and
exciting surface plasmons on a plasmonic waveguide extending from the emission end of the active region, the plasmonic waveguide shaping and guiding the surface plasmons to create a hot spot on a recording medium.

17. The method of claim 16, further comprising a gap of dielectric material between the plasmonic layer and the internal layers.

18. The method of claim 16, wherein the plasmonic layer covers at least three sides of the internal layers.

19. The method of claim 16, wherein the plasmonic waveguide shapes and guides plasmons to create a sub-50 nm spot on a recording medium.

20. The method of claim 16, wherein the plasmonic layer extends to cover part of an emission end of the active region.

* * * * *